（12） United States Patent
Rader

(10) Patent No.: US 6,727,293 B2
(45) Date of Patent: Apr. 27, 2004

(54) NOVOLAC-EPOXY RESIN FOAM, FOAMABLE COMPOSITION FOR MAKING NOVOLAC-EPOXY RESIN FOAM AND METHOD OF MAKING NOVOLAC-EPOXY RESIN FOAM

(75) Inventor: Samuel L. Rader, Lewisburg, WV (US)

(73) Assignee: American Foam Technologies, Inc., Newport, RI (US)

( * ) Notice: Subject to any disclaimer, the term of this patent is extended or adjusted under 35 U.S.C. 154(b) by 0 days.

(21) Appl. No.: 10/464,444

(22) Filed: Jun. 19, 2003

(65) Prior Publication Data

US 2003/0216487 A1 Nov. 20, 2003

Related U.S. Application Data

(62) Division of application No. 10/265,389, filed on Oct. 7, 2002, now Pat. No. 6,610,754, which is a division of application No. 09/436,971, filed on Nov. 9, 1999, now Pat. No. 6,492,432.

(51) Int. Cl.$^7$ .................................................. C08J 9/00
(52) U.S. Cl. ........................ 521/135; 521/136; 521/178; 521/181
(58) Field of Search ................................ 521/135, 136, 521/128, 181

(56) References Cited

U.S. PATENT DOCUMENTS

| | | |
|---|---|---|
| 3,389,094 A | 6/1968 | D'Alessandro |
| 4,090,986 A | 5/1978 | Gormley |
| 4,133,931 A | 1/1979 | Beale et al. |
| 4,140,842 A | 2/1979 | Beale et al. |
| 4,204,020 A | 5/1980 | Beale et al. |
| 4,205,135 A | 5/1980 | Beale et al. |
| 4,207,400 A | 6/1980 | Dahms |
| 4,207,401 A | 6/1980 | Dahms |
| 4,216,295 A | 8/1980 | Dahms |
| 4,247,413 A | 1/1981 | Beale et al. |
| 4,256,803 A | 3/1981 | Savey et al. |
| 4,281,069 A | 7/1981 | Harris |
| 4,291,146 A | 9/1981 | Haug |
| 4,303,758 A | 12/1981 | Gusmer |
| 4,332,335 A | 6/1982 | Fiorentini |
| 4,353,994 A | 10/1982 | Smith |
| 4,390,641 A | 6/1983 | Smith |
| 4,419,460 A | 12/1983 | Ho |
| 4,423,163 A | 12/1983 | Doerge |
| 4,444,912 A | 4/1984 | Carlson et al. |
| 4,521,543 A | 6/1985 | Ruhl |
| 4,530,939 A | 7/1985 | Rickle |
| 4,539,338 A | 9/1985 | Carlson et al. |
| 4,546,119 A | 10/1985 | Lunt et al. |
| 4,560,707 A | 12/1985 | Iwase |
| 4,575,521 A | 3/1986 | Cote et al. |
| 4,576,972 A | 3/1986 | Lunt et al. |
| 4,595,710 A | 6/1986 | Albertelli |
| 4,694,028 A | 9/1987 | Saeki et al. |
| 4,720,510 A | 1/1988 | Marks et al. |
| 4,798,848 A | 1/1989 | Diethelm |
| 4,882,364 A | 11/1989 | Kyle |
| 4,883,824 A | 11/1989 | Meunier et al. |
| 4,900,759 A | 2/1990 | Clark |
| 4,920,154 A | 4/1990 | Monstrey |
| 4,956,394 A | 9/1990 | Kifer |
| 5,166,184 A | 11/1992 | Hashimoto |
| 5,234,969 A | 8/1993 | Clark |
| 5,407,963 A | 4/1995 | Willson |
| 5,432,207 A | 7/1995 | Rader |
| 5,441,992 A | 8/1995 | Santos |
| 5,444,098 A | 8/1995 | Wallaeys |
| 5,514,725 A | 5/1996 | Rader |
| 5,596,022 A | 1/1997 | Jones |
| 5,616,626 A | 4/1997 | Rader |
| 5,652,276 A | 7/1997 | Ando |
| 5,693,684 A | 12/1997 | Rader |
| 5,804,005 A | 9/1998 | Buck |
| 5,919,833 A | 7/1999 | Wernsing |

FOREIGN PATENT DOCUMENTS

| | | |
|---|---|---|
| FR | 88 471 | 4/1987 |
| JP | 62261627 | 4/1989 |
| JP | 11255939 | 9/1999 |
| WO | WO 97/08230 | 3/1997 |

OTHER PUBLICATIONS

J.H. Sanders, et. al., "The Mechanics of Foam Formation", pp. 92–95.
H.P. Horner, "Epoxy Foams", vol. 11, pp. 276–277.
A.W. Christiansen, "Differential Scanning Calorimetry of Phenol–Formaldehyde Resols", pp. 2279–2289.

*Primary Examiner*—Morton Foelak
(74) *Attorney, Agent, or Firm*—Jeffrey S. Melcher; Manelli Denison & Selter, PLLC

(57) ABSTRACT

Provided is a foamable composition adapted to form a cross-linked novolac-epoxy resin foam. The foamable composition is formulated from a composition comprising at least one novolac resin, at least one epoxy resin, and at least one blowing agent.

48 Claims, 3 Drawing Sheets

NOVOLAC-EPOXY RESIN FOAM, FOAMABLE COMPOSITION FOR MAKING NOVOLAC-EPOXY RESIN FOAM AND METHOD OF MAKING NOVOLAC-EPOXY RESIN FOAM

This is a divisional of U.S. Ser. No. 10/265,389, filed Oct. 7, 2002, now U.S. Pat. No. 6,610,754, which is a divisional of U.S. Ser. No. 09/436,971, filed Nov. 9, 1999, now U.S. Pat. No. 6,492,432, the complete disclosures of which are incorporated herein by reference.

FIELD OF THE INVENTION

The present invention relates to a novolac-epoxy resin foam, a method for making a novolac-epoxy resin foam, and a foamable composition for forming a novolac-epoxy resin foam.

BACKGROUND OF THE INVENTION

Phenolic resin foams are well known and provide many advantages over polyurethane foams. For example, polyurethane foams produce many toxic fumes when burned, whereas phenolic foams produce significantly less toxic fumes when burned. Phenolic resin foams are usually formed from a resol resin, as described in my U.S. Pat. Nos. 5,616,626 and 5,693,684, the complete disclosures of which are incorporated herein by reference. Resol resins are formed by reacting phenol based compounds with an aldehyde. Linear resol resins are commonly known as novolac resins.

Polyurethane foams can be easily be formed having a closed-cell structure. A closed-cell structure is understood as the ability of the cell wall to inhibit the outward diffusion of trapped blowing gas and the inward diffusion of air. Such closed-cell polyurethane foams can be produced under atmospheric pressure. In contrast, conventional phenolic resin foams must be produced under high pressure to form such a closed-cell structure. U.S. Pat. No. 4,423,163 describes such a high pressure method for making a closed-cell phenolic resin foam, in which the foam is produced under about 6 psi. The requirement of pressure for making a closed-cell phenolic foam results in significant disadvantages and is not commercially feasible, especially when compared to closed-cell polyurethane foams that can be produced under atmospheric pressure.

My U.S. patent application Ser. No. 09/070,765, the complete disclosure of which is incorporated herein by reference, discloses a method for forming closed-cell phenolic resin foam, which utilizes a bond strength enhancing agent so that the foam can be formed under ambient pressures.

There is a need for other methods of making closed-cell phenolic resin foams that do not require the use of pressure greater than atmospheric. There is also a need for an adjustable, phenolic based foam system which can be adapted to be sprayable, to provide various levels of closed and open cells, to provide different levels of flexibility, and to meet local residential and commercial building flamability codes.

Spray foaming is a process in which two or more reactive components are mixed, such as in a mixing head, where they begin to react. The resulting reaction mixture is then sprayed onto a surface where the mixture foams and cures, thereby forming a cured foam layer on the surface. A mixing head suitable for use in carrying out spray foaming is described in U.S. Pat. No. 4,332,335, which is incorporated herein by reference. The head consists of a mixing chamber which communicates with a discharge orifice and first and second ducts which dispense the reactive components into the mixing chamber. Means are provided for regulating the flow of the reactants to the reaction chamber.

To be suitable for spraying, the foam-forming composition must have a low viscosity. For spraying on vertical surfaces the foam-forming composition must also have a fast cure speed to prevent gravity-induced sagging or running of the foam. Therefore, spraying methods have been used primarily for foam-forming compositions consisting of polyurethane and polyisocyanate resins, which have the combination of a low viscosity and a fast cure rate. However, foam-forming compositions based on polyurethane and polyisocyanate produce a polyurethane foam having an undesirably low temperature resistance, which significantly limits the use of polyurethane foams. For example, insulation for use in residential homes, commercial buildings, foundries, automobiles, boats, and wherever high temperature insulation is required, must have a temperature resistance significantly greater than that of polyurethane foams. The temperature resistance of the polyurethane foam can be increased slightly by using additives. However, such additives have many undesirable effects on the properties of the foam. Furthermore, when polyurethane foams are burned they undesirably produce fumes which are very toxic to humans.

Foams made from phenolic resins have a temperature resistance significantly greater than polyurethane foams. Furthermore, foams made from phenolic resins do not produce toxic fumes when burned. However, known foam-forming, phenolic resin compositions have not previously been used in spraying methods because they exhibit undesirably slow curing rates, the viscosity of the phenolic resin composition is undesirably high for spray applications, and chemical blowing agents must be added to produce the foam. Use of chemical blowing agents, such as chlorofluorocarbons, are undesirable because they are environmentally unfriendly. Thus, there is and has been a need for a sprayable, foam-forming composition having the combination of properties of (a) not requiring the use of an external blowing agent, (b) having a viscosity suitable for spraying, (c) having a suitably fast curing rate, and (d) when suitably cured providing a foam having a high temperature resistance and which does not produce toxic fumes when burned.

My U.S. Pat. No. 5,693,684 discloses a sprayable, foam-forming phenolic resin composition. Resol resins are utilized, preferably in combination with a phenol compound. This patent does not specifically disclose the use of epoxy resins in combination with novolac resins.

U.S. Pat. No. 4,291,146 discloses a heat-curable mixture of epoxide resins and beta-aminocrotonic acid derivatives. This patent discloses that the epoxy formulations may be used to form foams. Use of a glycidylised phenol novolac resin having epoxide equivalent weight of 175 is disclosed in the examples. However, this patent does not disclose reacting an epoxy resin with hydroxyl groups present on a novolac resin while blowing to form a foam, nor a flexible system of providing different levels of flexibility in the cured foam by adjusting the ratio of epoxy resin to novolac resin. This patent also does not disclose a foam that is suitable for spraying.

There is a need for an adjustable, foam-forming system to provide varying levels of foam flexibility, a neutral pH to avoid corrosion, and which can be adapted to be sprayable.

There is also a need for a flame-retardant foam which does not produce toxic fumes when burned.

SUMMARY OF THE INVENTION

The above objectives and other objectives are achieved by the novel combination of a novlac resin and an epoxy resin to provide foams. The flexibility of the foam can be easily increased by increasing the amount of novolac resin compared to the amount of epoxy resin. The foam forming composition can easily be adapted for spraying applications.

The present invention provides a novel foamable composition adapted to form a cross-linked novolac-epoxy resin foam. The foamable composition is formulated from a composition comprising at least one novolac resin, at least one epoxy resin, and at least one blowing agent.

The present invention also provides a flame-retardant, foamable, novolac-epoxy resin composition. The foamable composition is formulated from a composition comprising at least one novolac resin, at least one epoxy resin, at least one blowing agent and at least one flame retardant.

DETAILED DESCRIPTION OF PREFERRED EMBODIMENTS

Figure 1:
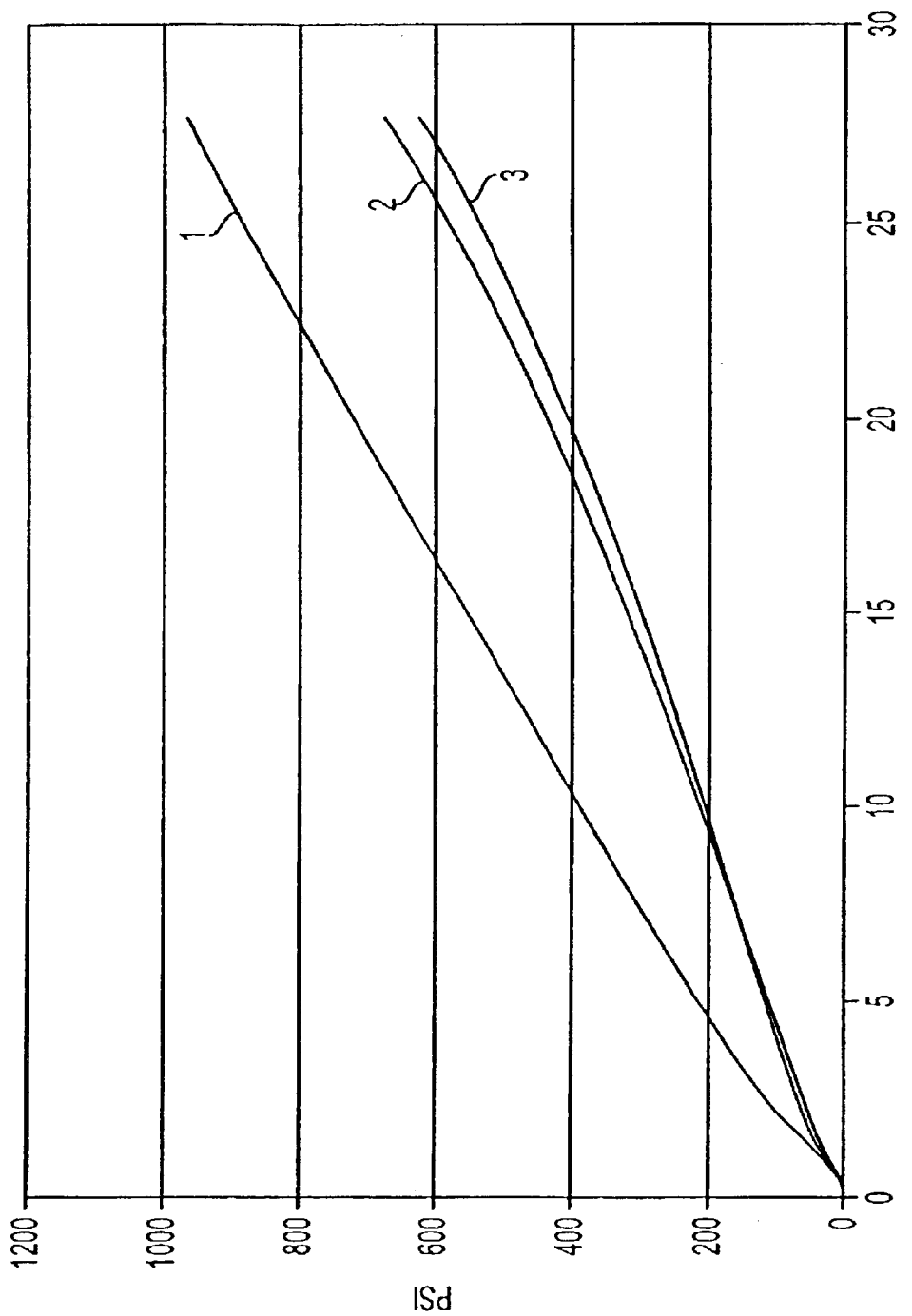
FIG. 1 illustrates is graph of the results of multiple compressions on a novolac-epoxy resin according to the present invention.

The reaction mechanism between novolac resin and epoxy is now well known. Novolac resin is commonly used to cure epoxy resins. However, novolac/epoxy resin combinations have not been used to make foams since the cure rate and reactivity were too low. However, by using the new combinations of specific epoxy and novolac resins described herein, the reactivity is greatly enhanced and suitable for any foaming application. Furthermore, it has now been found that the combination of novolac and epoxy resin, where the novolac is used in far greater amounts than merely as a curing agent, provides many unexpected advantages as follows.

The present invention relates to a highly adjustable, foam-forming system based on the combination of novolac resin and epoxy resin to provide a broad range of desired foam properties. By varying the ratio of novolac resin to epoxy resin, the flexibility of the cured foam can be altered dramatically. In general, greater amounts of novolac resin provide a more flexible foam and greater amounts of epoxy resin provide a more rigid foam. Based on the disclosure provided herein, one of ordinary skill in the art of formulating foamable compositions will easily be able to provide the desired level of flexibility in the final cured foam by adjusting the ratio of novolac resin to epoxy resin. For example, a flexibility similar to a rubber tire in which a 1 inch foam can be bent 180° is easily attainable, as well as very rigid foams having a high tensile strength.

The combination of novolac resin and epoxy resin also provides the unexpected capability of providing foams having a high closed-cell content of about 80 to greater than 90%, with curing under ambient pressures. Usually, high pressures are required to form close-cell phenolic resin foams. High insulation R values of about 6.5 are attainable for 1 inch closed-cell novolac-epoxy resin foam. Closed-cell contents of at least 80%, preferably at least 90% are easily attainable. However, if desired, the foamable composition can be formulated to provide an open cell foam for the desired application, for example, by the use of well-known lysing agents such as sodium laureth sulfate or dodecyl benzene sulfonic acid.

The novolac-epoxy resin foams produced according to the present invention provide the advantage that when burned they do not produce significant amounts of toxic fumes, rather only carbon dioxide, carbon and few nitrous oxides. In contrast, other conventional foams such as polyurethanes produce cyanide when burned. If desired, the flamability can be reduced to levels which meet industrial and residential fire codes, as described below.

The foamable composition can be formulated to have any desired pH. Preferably, the foamable composition is formulated to have a pH of from about 7 to about 9, and more preferably about 7, which is non-corrosive. Most preferably, the foamable composition is substantially acid free. In this manner, the cured foam will be non-acidic and non-corrosive. Acidic foams cause many problems such as corroding the surrounding materials and machinery used to form and shape the foam.

The flexible foamable composition can be easily formulated for any desired application. For example, liquid novolac resins and epoxy resins can be utilized to form sprayable, foamable compositions, to provide foams having any desired level of flexibility. Alternatively, solid and/or high viscosity novolac resins and epoxy resins can be dissolved in a solvent blowing agent to form sprayable, foamable compositions. For non-spray foaming applications, the sprayable formulations may be used if desired, or highly viscous foamable compositions can be formulated.

The novolac-epoxy resin foams produced according to the present invention are suitable for almost any foaming application, since they are capable of high degrees of flexibility or rigidity, temperature resistance, chemical resistance, and reduced toxicity when burned. Furthermore, the foams can be produced by many methods, including spray-foaming, and can be formulated to provide little outgassing for use in confined spaces, as well as open or closed-cells. The following are non-limiting examples of suitable applications:

Mining applications where non-toxicity, high temperature resistance, and low outgassing are required since the foam is sprayed in a closed space;

Automotive applications where many different types of foam properties are required, such as high temperature resistance for heat and noise shielding from the engine, as well as insulation from outside temperature and noise, light weight and non-toxicity are also required;

Residential and commercial building applications, can be formulated to be non-flammable such that the foam is self extinguishing and does not produce toxic fumes, rigid for use in support panels, such as shown in U.S. Pat. No. 4,423,163, or can be sprayable for application in roofs, side walls, floors or any space;

Aircraft applications, can be formulated to provide flexible or high strength rigid foams, major factors include light weight, non-toxic when burned, high temperature resistance, corrosion resistance, and high insulation properties;

Military ships, which require foams that can be used as flooring panels, fuse boxes, missile silos, and the like, where high temperature resistance, corrosion protection, and low toxicity when burned are major factors;

Prototyping applications, for example industrial design engineers where corrosion and flamability are major factors since acidic foams can corrode knifes and surrounding materials, such as decals, paints, etc., compositions can be formulated to provide rigid yet easily cuttable and light weight foams;

Artistic applications such as sculptures and movie or play sets, where corrosion and flamability are major factors, acidic foams can corrode knifes and surrounding materials, such as decals, paints, etc., foam can be formed to be rigid yet easily cuttable and light weight;

Aerospace applications, which require high temperature resistance and flexibility over a wide temperature range to avoid delamination from cryogenic tanks and other equipment that expands and contracts, also as ablative material during reentry into atmosphere;

Heat shielding applications, such as on oil rigs, petroleum storage facilities, combustion chambers, power plants, and the like, where high temperature resistance and low toxicity are required;

Mass-transit applications, such as busses and trains, where light weight, non-toxicity, and high temperature resistance are required; and Insulation applications, such as flexible tapes, rigid panels, flexible panels, boards and laminates.

As can be appreciated from the above, the uses for the non-toxic, non-corrosive, high temperature resistant foams according to the present invention which can be easily tailored to provide different levels of flexibility has limitless applications.

The present invention will now be described with reference to different embodiments, without being limited thereto.

Sprayable, Foamable Composition

Sprayable, foamable compositions usually require a low viscosity, in the range of about 50 to about 1000 centipoise at 25° C., preferably about 50 to about 500 centipoise at 25° C. For most spraying applications, which are on non-horizontal surfaces or ceilings where gravity-induced sagging or running can be a problem, the foamable composition must also have a fast cure speed, on the order of about 5 minutes or less, preferably about 1 minute or less. Cure speed is the time from when the novolac and epoxy resins are mixed to when a tack free surface is formed on the foam. When a tack free surface is formed on the foam, the foam usually has sufficient integrity to substantially avoid sagging or running. The curing rate for completely curing the novolac-epoxy foam can be significantly longer, on the order of about 1 hour.

Surprisingly, the foamable compositions according to the present invention can be formulated to provide a fast cure speed and low viscosity which are suitable for spraying. In this regard, the novolac resin selected should be liquid and have a viscosity of from about 100 to about 3,000 centipoise at 25° C., and more preferably about 500 to about 750 centipoise at 25° C. If a mixture of novolac resins are utilized, the combined viscosity should be within these ranges. The novolac resin should also have a number average molecular weight that is suitable for the desired foaming application. For example, when using novolac resins formulated from phenol, suitable number average molecular weights are from about 100 to about 500, preferably about 100 to 400, and most preferably from about 150 to about 250. Preferably, the novolac resin is free of epoxide groups.

There are many commercially available novolac resins that are suitable for use in formulating the foamable composition. Examples include, but are not limited to HRJ444, HRJ-1166, HRJ-406, HRJ-425, and SP-1068 from S.I.I.

If desired, the novolac resin can be easily formulated from a phenol based compound and an aldehyde. The formation of novolac resins is now well known and one skilled in the art will easily be able to form the desired novolac resin. For example, 1 molar ratio of phenol to aldehyde can be reacted un the presence of well known acid catalysts until the desired molecular weight is obtained, and then neutralize by adding well known bases. Novolac resin is a substantially linear chain of phenol-based groups bound together. The novolac resin is usually quite stable and does not require refrigeration. For some applications, minor amounts of non-linear Resol resin may be present.

The novolac resin can be used in any desired amount. In general, the greater the amount of novolac resin, the more flexible the cured novolac-epoxy resin foam. Suitable amounts for the novolac resin are from about 5 to about 95% by weight, preferably about 20 to about 80% by weight, and more preferably from about 40 to about 60% by weight. All weight % are based on the total weight of the foamable composition unless stated otherwise.

For sprayable applications, the epoxy resin should also be a liquid under ambient conditions. Suitable viscosities for the epoxy resin are from about 100 to about 10,000 centipoise at 25° C., preferably about 1,000 to about 6,000 centipoise at 25° C. The epoxy resin preferably has a number average molecular weight of from about 250 to about 650.

The epoxy resin can be used any amount desired. In general, the greater the amount of epoxy resin, the more rigid the cured novolac-epoxy resin foam. Suitable amounts for the epoxy resin are from about 5 to about 95% by weight, preferably about 20 to about 80% by weight, more preferably from about 40 to about 60% by weight.

Preferably, the epoxy resin has about 2 or more terminal epoxide groups on average to provide a fast cure speed. For spray-foam applications, the cure time should be about 5 min or less, preferably 1 min or less. To provide such fast cure speeds, the epoxy resin or resins selected should have about 2 or more terminal epoxide groups on average, preferably about 2 to about 5, and most preferably about 3 on average. An average of 3 terminal epoxy groups is capable of providing a cure speed of about 45 seconds to 1 minute. However, in applications where a fast cure speed is not required, less reactive epoxy resins can be used, such as when spraying on a horizontal surface where sagging or running is not a problem. Epoxy resins having less than 2 terminal epoxy groups on average generally require about 1 hour to cure. A slower curing foamable composition may be desired where multiple layers are applied, such that later layers can be applied before the lower layers are cured. In this manner, the layers can co-cure to provide enhanced adhesion therebetween.

One or ordinary skill in the art will be able to formulate any desired epoxy resin can by now well known techniques. Examples of suitable commercially available epoxy resins includes Epon Resin 8161, 826 and 828 (Shell Chemical) and PC-601 and PC-661 (Polycast Chemical).

Any suitable blowing agent can be utilized. The blowing agent can be formulated from any inorganic and/or organic substance that provides the desired vapor pressure at the selected blowing temperature, such as by volatization and/or chemical reaction. Preferably, a reactive blowing agent is utilized which produces a gas by an in situ reaction during the blowing and curing stages of forming the novolac-epoxy foam. An example of a preferred reactive blowing agent is one which contains a reactive hydrogen group, such that when an amine catalyst is utilized, the reactive hydrogen group reacts with the amine to form hydrogen gas and blow the foam. The chemical reaction between the reactive hydrogen group and the amine group also provides heat which increases the cure speed of the novolac-epoxy resin mixture. When the novolac and epoxy resins are initially mixed at ambient temperatures, they generally do not produce a significant amount of initial heat of reaction and the reaction usually proceeds slowly. However, when a reactive blowing agent is utilized, temperature increases from room temperature to a temperature in the range of about 100 to 140° F. within 1 minute after mixing the novolac and epoxy resins are attainable, which includes heat generated by the reaction of the reactive blowing agent to form a blowing gas. After about 20 minutes, the temperature usually increases to about 300° F. upon which the reaction is about 98% complete.

Specific examples of reactive blowing agents include the commercially available EF-10 (Applied Polaramics) and Z-6040, Z-6030 and Z-6011 (Dow Corning), which are all silicone compounds having a reactive hydrogen group (hydrogen donor group) which is capable of reacting with an amine functional group. Preferably, the reactive blowing agent comprises silicone having a reactive hydrogen group that is capable of reacting with an amine group under the desired blowing conditions. Silicone compounds are only an example of reactive blowing agents, and those skilled in the art are well aware of many other types of reactive blowing agents which produce a blowing gas upon reaction during blowing of the foam, which are suitable for use in the present invention.

While not desired from the standpoint of environmental friendliness, the blowing agent can be formulated from one or more volatile organic liquids that provide the desired vapor pressure at the selected blowing temperature. Examples of suitable liquid organic blowing agents include hydrocarbons and halogenated hydrocarbons, such as chlorofluorocarbons, fluorocarbons, ethanated chlorofluorocarbons and chlorocarbons.

If desired, water can be utilized as a blowing agent, especially when higher density foams are required Novolac resins are typically suspended in an aqueous solution, which can be used as the blowing agent. Typical amounts of water are from about 1% to about 10% water, based on the weight of the novolac resin.

In spray-foam applications, preferably a reactive blowing agent is utilized which generates a blowing gas by reaction during curing of the novolac and epoxy resins and which provides heat of reaction to facilitate a fast cure speed. A particularly preferred reactive blowing agent is one that contains a reactive hydrogen group that reacts with an amine group present in an amine catalyst.

Blowing agents are now well known in the art. One skilled in the art of formulation foamable compositions will be able to select desired blowing agents as required for the particular application. For example, for in-plant applications where heat can easily be applied to the foamable composition, liquid solvent blowing agents may be desired. However, for out-in-the-field applications, such as in construction or mining applications, where application of heat may be difficult, a reactive blowing agent can be utilized which provides heat during the formation of the blowing gas to increase the cure speed of the novolac and epoxy resins. Usually, a reactive blowing agent is required for spray foaming applications to provide a suitable cure speed to avoid sagging or running of the foam.

If desired, higher viscosity and/or solid novolac and epoxy resins can be utilized, if they are adequately dissolved in a solvent to provide a solutions suitable for spraying. The solvent may also be the blowing agent. However, the preferred method is the use of low viscosity novolac resins and liquid epoxy resins, as described above.

The use of catalysts is not required for all applications. However, a free-radical generating catalyst is preferably included to facilitate ring-opening of the epoxide groups and further enhance the cure speed. Any conventional epoxide catalyst can be used. However, low pH catalysts may undesirably hinder curing of the novolac resin, which is usually cured using a base, such as an amine or hydroxide group. Preferably, a basic catalyst is incorporated to increase curing of the novolac resin.

Preferably, a dual function catalyst added which provides catalytic properties as well as reacting with a reactive blowing agent to generate a blowing gas. For example, an amine catalyst can be combined with a reactive blowing agent having a reactive hydrogen group. In this manner the amine catalyzes the curing of the novolac and epoxy resins as well as reacts with the reactive hydrogen group to form hydrogen gas and blow the foamable composition. This reaction also has the added benefit of supplying heat to increase the cure speed. Examples of suitable dual function catalysts include alkyl polyamine, triethyl amine, aliphatic amines and polyaminoamides.

A surfactant can be added to facilitate the production of a foam bun having a good height, small, uniform cells, and a low thermal conductivity. Surfactants can also be added to reduce the shear necessary to form a homogenous mixture of novolac resin and epoxy resin, for example, by creation of micelles. Furthermore, surfactants can be used to reduce the viscosity of the composition to about 1000 or less.

Examples of suitable surfactants include ethoxylates, which are compounds containing recurring ether linkages and are made by reacting ethylene oxide and/or higher alkylene oxides, such as propylene oxide, butylene oxide, styrene oxide, etc. with various compounds or initiators containing an active hydrogen atom such as alcohols, alkylphenols, fatty acids, fatty acid amides, fatty acid esters, etc. These surfactants include, but are not limited to, the following surfactant categories: alcohol ethoxylates; alkyphenol ethoxylates; polyoxyethylene esters; ethoxylated anhydrosorbitol esters; ethoxylated natural fats, oils and waxes; ethoxylated lanolin; polyoxyethylene amines; polyoxyethylene fatty acid amides and block copolymers of ethylene oxide with higher alkylene oxides.

Polyoxyethylene esters include, but are not limited to, ethoxylated mono and diesters of fatty acids and aliphatic acids. These compounds include laurates, oleates, stearates, pelargonates, tallates and rosin acid esters. These polyoxyethylene esters include polyoxyethylene esters sold under the trademarks: EMEREST by Henkel; ETHOFAT made Akzo Nobel; KESSO made by Stepan; and WITCONOL made by Witco.

Ethoxylated anhydrosorbitol mono, di and triesters include, but are not limited to, oleates, laurates, palmitates, stearates, and tallates. These surfactants include surfactants sold under the reademarks: EMSORB made by Henkel and SPAN and TWEEN made by ICI.

Ethoxylated castor oil and laolin are examples of ethoxylated natural products. These ethoxylated natural products include thoxylated natural products sold under trademarks: SURFACTOL made by CasCem; EMERY made by Henkel; and RITACHOL made by R.I.T.A.

Ethoxylated fatty acid amides are usually made by reacting one or more moles of ethylene oxide with and amide made from diethonolamine that has been esterifies with a fatty acid, such as lauric, hydrogenated tallow or oleic. These ethoxylated fatty acid amides include ethoxylated fatty acids sold under the trademarks: ETHOMID made by Akzo Nobel and AMIDOX made by Stephan.

Block copolymers are formed when both ehtylene oxide and higher allyl oxides, such as propylene oxide, are selectively reacted with a base compound containing and active hydrogen. Base compounds or initiators include glycols, diamines, etc. These initiators include initiators sold under the trademarks: ANTAROX made by Rhone-Poulenc and PLURONIC and TETRONIC made by BASF.

The above variations in the surfactants allow nonionic organic surfactants to be made covering a wide rage of emulsification. These surfactants contain both hydrophillic and lipophilic groups on the same molecule. The emulsion characteristics of surfactants can be compared by determining their hydrophilic/lipophilic balance (HLB). HLB values range from 1 to 30 with lipophilic surfactants at the low end of the range and hydrophilic surfactants at the high end of the range. The nonioic, organic surfactants utilized in the present invention to stabilize the foam preferably are those which are highly hydrophilic. In particular, preferred nonionic, organic surfactants exhibit a hydrophilic/lipophilic balance of at least about 12 and more preferably, at least about 15 or greater.

A particularly preferred surfactant is the commercially available SF 1188 (General Electric).

The amount of nonionic, organic surfactant utilized in the foamable composition typically ranges from about 0.01% to about 5% by weight, and preferably, from about 0.1% to about 3% by weight.

If desired, the foamable composition can be easily formulated to reduce the flamability of the foam. When non-flamability is desired, the number of hydroxyl groups in the foamable composition should be reduced, preferably the composition is free of hydroxyl groups. The presence of hydroxyl groups generally increases the flamability of the foam.

To further reduce the flamability of the foam, a flame retardant can be incorporated in the foamable composition. Flame retardants are well known in the art and one skilled in the art will easily be able select and utilize flame retardants in the foamable composition base on the disclosure provided herein. Examples of suitable flame retardants include silicates and brominated aluminum oxide. A commercial example is Fyrol (DuPont). A preferred flame retardant is sodium silicate, which reduces flamability by encapsulation. Once the silicate group is heated in the presence of a flame, it forms an encapsulating glass and gives off water, which prevents further burning of the foam. Thus, the foam is self-extinguishing. In this manner, the novolac-epoxy foam can be formulated to meet or exceed commercial and residential building codes. Sodium silicate can be added in an amount to provide the desired level of non-flamability. Suitable amounts have been found to be from about 0.001:1 to about 1:1 (moles flame retardant):(moles epoxy). Silicate flame retardants can be in amounts up to 40% by weight, preferably from about 10 to about 40% by weight.

Usually, the sprayable, foamable formulation is formulated in 2 or more parts which are combined in the spray head during application. Usually, the novolac resin is separated from the epoxy resin since the resins can co-cure over time under ambient conditions. However, if stabilizing or blocking agents are added, it may be possible to have the novolac resin and epoxy resin in the same part. Surfactants can generally be added with either the novolac or epoxy resin. If using a reactive blowing agent, it should be added in the part containing the novolac resin and the amine catalyst combined with the part containing the epoxy resin. One of ordinary skill in the art of formulating foam compositions will easily be able to formulate two or more part formulations which can added in the field forming the novolac-epoxy resin foam on demand.

Non-Spray Foaming

The viscosity of the foamable composition can be significantly higher for non-spray foaming applications. Therefore, higher viscosities for the novolac and epoxy resins can be tolerated. In some instances, solid, powdered novolac and/or epoxy resins can be utilized. Novolac resins can even be partially or completely replaced with well-known non-linear Resol resins. However, from the standpoint of long-term stability of the resins, linear novolac resins are preferred.

The present invention will further explained with reference to the following non-limiting examples.

EXAMPLES

An Epoxy Resin A was first formed by combining the components shown in Table 1.

TABLE 1

| Epoxy Resin A | | | |
|---|---|---|---|
| | Component | MW | Amount (g) |
| (1) | Epichlorohydrin | 92.53 | 2128.19 |
| (2) | Bisphenol A | 228.28 | 2282.8 |
| (3) | Ca(OH)$_2$ | | 58 |

1 and 2 were added to a 5 liter reaction flask. Then the catalyst was titrated in at a rate of 10 ml per min.

| Time | Temp. | Procedure |
|---|---|---|
| 8:45 am | 20° C. | Add 1 and 2 to vessel |
| 9:50 am | 20° C. | Turn on stir |
| 10:00 am | 24° C. | Add 3 powder; add slow |
| 10:35 am | 81° C. | Catalyst is in solution |
| 11:35 am | 92° C. | Resin viscosity 78 cp's |
| 12:15 pm | 65° C. | Resin viscosity 96 cp's |
| 1:20 pm | 50° C. | Resin viscosity 150 cp's |
| 2:10 pm | 50° C. | Resin viscosity 228 cp's |
| 3:00 pm | 40° C. | Resin viscosity 340 cp's |
| 4:00 pm | 27° C. | Resin viscosity 1430 cp's |
| 4:30 pm | 27° C. | Shut reaction down |

The physical properties of the Epoxy Resin A were tested and the results are shown in Table 2.

TABLE 2

| Reactivity | pH | Solids | Viscosity |
|---|---|---|---|
| 28 sec gel | 8.5 | 68% | 2600 cps |

A Novolac Resin A was formed by combining the components shown in Table 3.

TABLE 3

Novolac Resin A

| | Component | MW | Weight (g) |
|---|---|---|---|
| (1) | $C_6H_6O$ | 94.11 | 1882.2 g |
| (2) | $CH_2O$ | 30.03 | 1201.2 g |
| (3) | $H_2So_4$ | | 57.69 g |
| (4) | NaOH | | 40.1 g |

Components 1 and 3 were added to a 5 liter flask and the stirrer was turned on. Component 2 was titrated into the flask at the rate of 30 ml per minute until completely consumed. The temperature was monitored and not allowed to exceed 110° C. The mixture was cook at about 95° C. After about 1 hour a sample of the novolac resin was removed and the viscosity tested. The reaction was stopped when the viscosity reached 450 centipoise at 95° C.

| Start Time | Temp. | Procedure |
|---|---|---|
| 8:17 am | 20° C. | Add 1 and 3 |
| 8:25 am | 20° C. | Mixing started |
| 8:30 am | 22° C. | Start to titrate |
| 8:55 sm | 98° C. | Titration finished |
| 9:50 am | 96° C. | Viscosity 290 cp's @ 95° C. |
| 10:45 am | 97° C. | Viscosity 360 cp's @ 95° C. |
| 12:00 | 99° C. | Viscosity 430 cp's @ 95° C. |
| 12:30 pm | 95° C. | Shut reaction down |
| 1:00 pm | 88° C. | Neutralize with NaOH |
| 1:01 pm | 86° C. | Add 40.1 g of 4 pH 8.5 |
| 1:10 pm | 85° C. | Add 5.2 g of NAOH pH 8 |
| 1:30 pm | 77° C. | Shut reaction down |

The physical properties the Novolac Resin were tested and the results are shown in Table 4.

TABLE 4

| Viscosity | Non Volatiles | pH | RI | Reactivity |
|---|---|---|---|---|
| 2200 @ 25° C. | 72% | 8.3 | 1.5115 | 35 sec gel time |

The color was red-orange.

A second Epoxy Resin B was formed by combining the components shown in Table 5.

TABLE 5

Epoxy Resin B

| | Component | MW | Weight (g) |
|---|---|---|---|
| (1) | Epichlorohydrin | 92.53 g | 1943.1 g |
| (2) | Bisphenol A | 228.28 g | 2282.8 g |
| (3) | $Ca(OH)_2$ | 56.4 g | |
| (4) | Tetrabromo-o cresol | 145.2 g | |

Components 1, 2 and 4 were added to a 7 liter reaction flask. 4 was cut into solution. Heat was added as needed.

| Time | Temp. | Procedure |
|---|---|---|
| 9:15 am | 20° C. | Add 1, 2, 4 to reactor |
| 9:30 am | 25° C. | ↑Δ to 50° C.; mix |

-continued

| Time | Temp. | Procedure |
|---|---|---|
| 10:15 am | 50° C. | Mix in $Ca(OH)_2$ |
| 10:45 am | 83° C. | Refluxing; start to read viscosity |
| 11:30 am | 83° C. | Viscosity 850 cp's |
| 12:30 pm | 85° C. | Viscosity 1240 cp's |
| 12:50 pm | 80° C. | Viscosity 1400 cp's |
| 1:30 pm | 81° C. | Viscosity 2001 cp's |
| 1:35 pm | 80° C. | Shut reaction down |
| 4:30 pm | 25° C. | Viscosity 3300 cp's |

The physical properties of Epoxy Resin B were tested and the results are shown in Table 6.

TABLE 6

| Solids | pH | Reactivity | Viscosity | Color |
|---|---|---|---|---|
| 76% | 8.2 | 35 sec gel | 3400 cp's | Clear |

In the following Examples, the novolac resin contained about 6% water, based on the weight of the novolac resin. Sodium silicate, when used, contained about 4% water based on the weight of the sodium silicate. Thus, each of the following examples contained water as a blowing agent.

Example 1

A novolac-epoxy resin was formed by combining the components shown in Table 7.

TABLE 7

| (1) | Epoxy Resin A | 100 g |
| (2) | Novolac Resin A | 200 g |
| (3) | Alkyl Polyamine | 35 g |
| (4) | Tween 40 | 15 g |

Components 1 and 2 were combined in a cup and then component 4 was added. The mixture was stirred for two minutes and then component 3 was added and mixed for 40 seconds. The mixture was allowed to foam.

| Foam Reactivity | | |
|---|---|---|
| Cream Time | Foam Time | Tack Free Time |
| 15 sec | 1 min, 20 sec | 2 min |

The foam looked good. A smooth skin on surface means that cell size was small.

| Density | Open Cell | Compression |
|---|---|---|
| 32 pcF | 90% | >5000 |

Cell size 1.5–2 microns

Example 2

A novolac-epoxy resin was formed by combining the components shown in Table 8.

TABLE 8

| | Component | Weight (g) |
|---|---|---|
| (1) | Epoxy Resin A | 100 g |
| (2) | Novolac Resin A | 200 g |
| (3) | Alkyl Polyamine | 35 g |
| (4) | Tween 40 | 15 g |
| (5) | GBL* | 15 g |

*GBL is gamma butarul lactone.

Components 1, 2, 4 and 5 were combined and mixed for two minutes. Component 3 was then added and the mixture was agitated at 3000 rpm's for 1.5 minutes and dumped into a mold heated to 95° F.

| Foam Reactivity | | |
|---|---|---|
| Cream Time | Foam Time | Tack Free Time |
| 15 sec | 35 sec | 50 sec |

Exotherm was high and foam outgassed, meaning open cells were formed. Cells were small.

Example 3

A novolac-epoxy foam was formed by combining the components shown in Table 9.

TABLE 9

| | Component | Weight (g) |
|---|---|---|
| (1) | Epoxy Resin A | 100 g |
| (2) | Novolac Resin A | 200 g |
| (3) | Alkyl Polyamine | 30 g |
| (4) | Tween 40 | 15 g |
| (5) | GBL | 15 g |

Mixed formula same as in Example 2, then dumped solution into heated mold.

| Foam Reactivity | | |
|---|---|---|
| Cream Time | Foam Time | Tack Free Time |
| 40 sec | 50 sec | 1 min, 10 sec |

No outgassing occurred. Foam exotherm was not as high in temperature as in Example 2. Reaction was slower and cell size was smaller, on the order of 1 micron.

Figure 2:
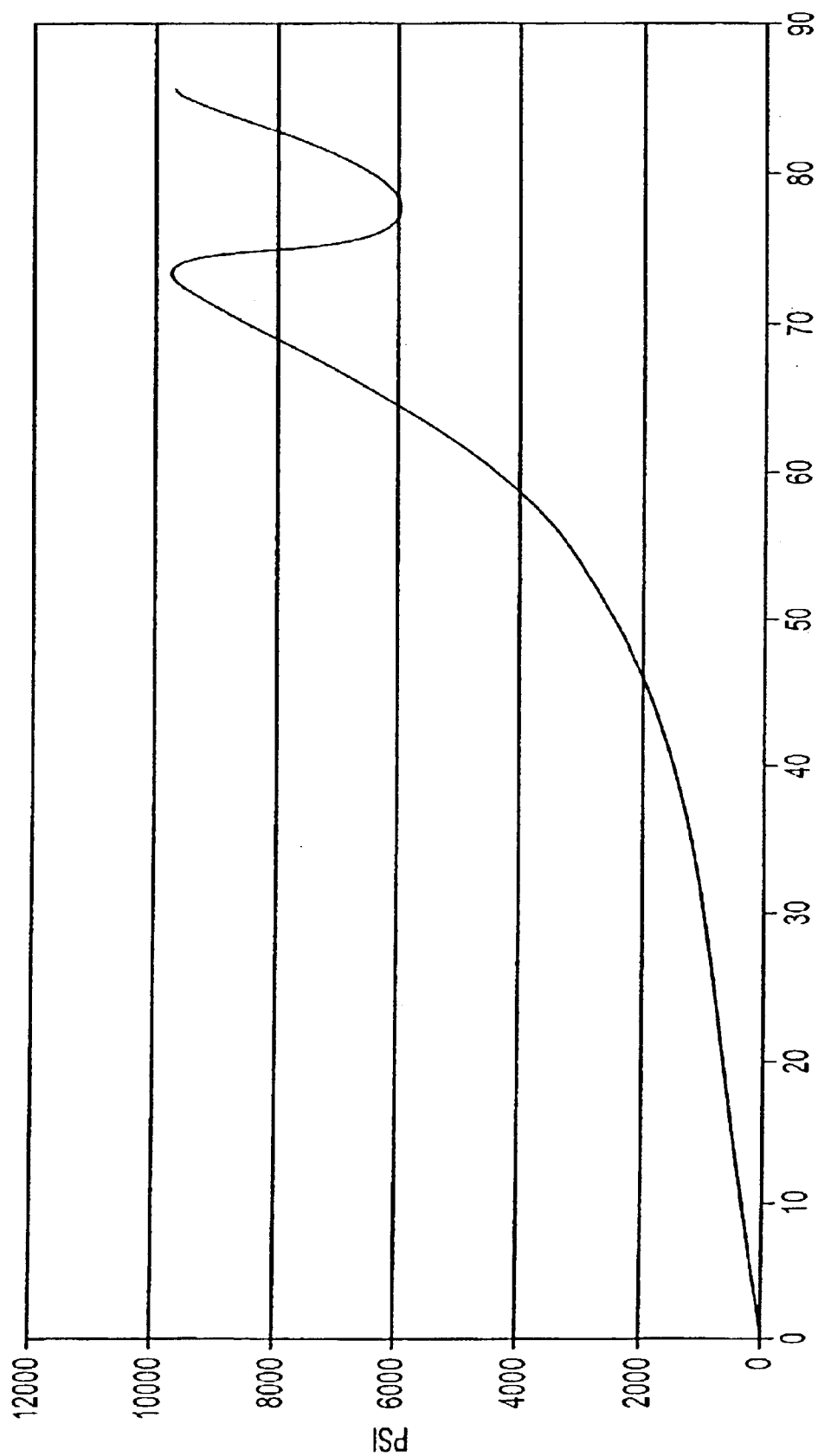
FIG. 2 illustrates a graph of the results of compressive strength parallel to rise on a novolac-epoxy resin according to the present invention.
Figure 3:
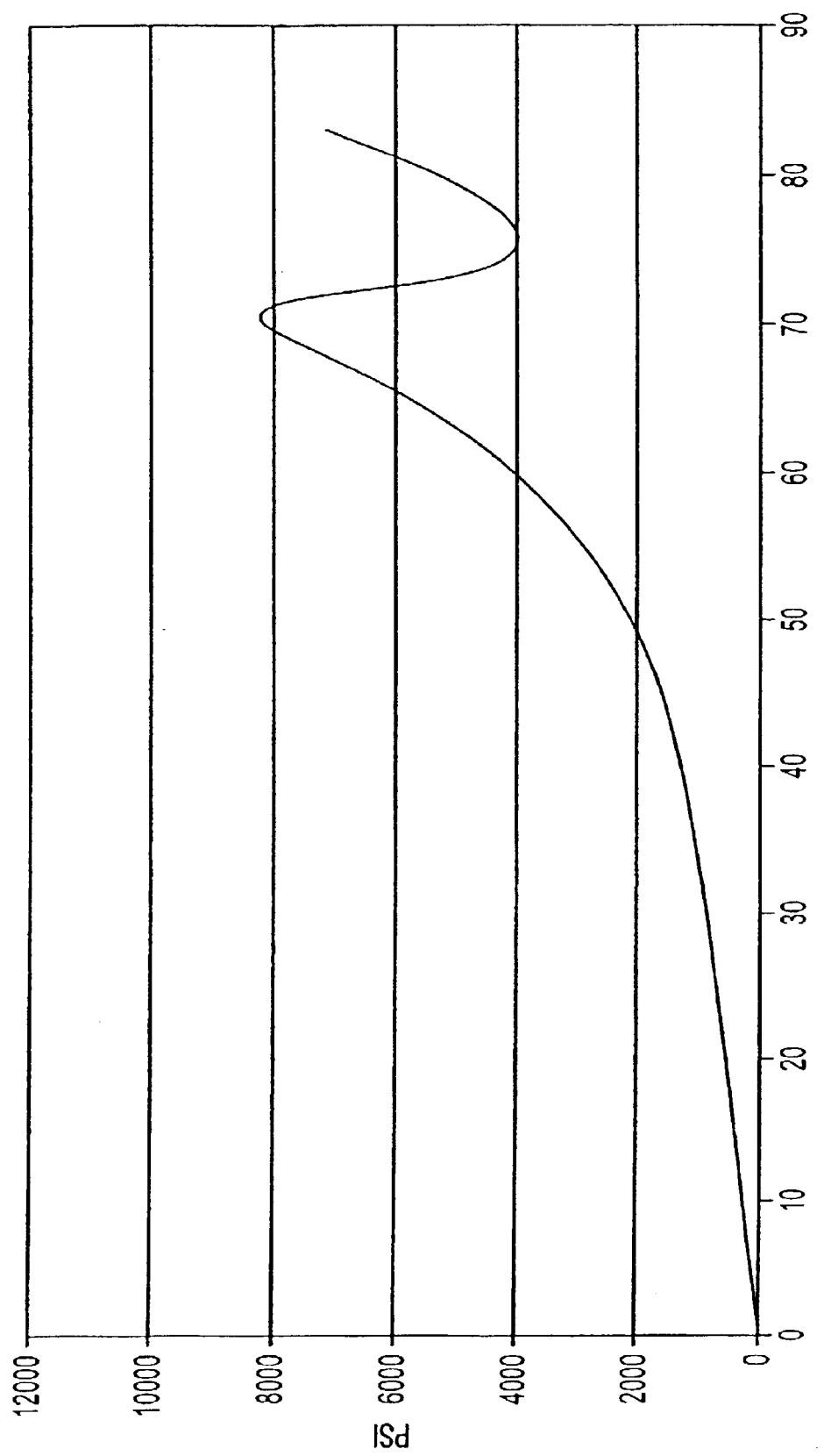
FIG. 3 illustrates a graph of the results of compressive strength perpendicular to rise on a novolac-epoxy resin according to the present invention.

A compressive test on the foam was conducted and the results are graphed in FIGS. 1–3. The first compress is 1, the second compression 2, and the third compression 3. As can be seen from the Figs., the parallel direction was slightly stronger than the perpendicular and the yield point occurred at a bout 70% strain.

The compressive test method was as follows. Two small blocks that were approximately 0.6 inch by 0.6 inch by 1 inch were cut out of the foam. One sample was oriented such that 1 inch was in the parallel direction and another such that 1 inch was in the perpendicular direction compared to the foam rise. Each sample was placed in the compression stand and the samples were compressed at a rate of 01 inch per minute.

Example 4

A novolac-epoxy resin was formed by combining the components shown in Table 10.

TABLE 10

| | Component | Weight (g) |
|---|---|---|
| (1) | Epoxy Resin A | 100 g |
| (2) | Novolac Resin A | 200 g |
| (3) | Alkyl Polyamine | 35 g |
| (4) | Tween | 28 g |
| (5) | Si* | .75 g |
| (6) | GBL | 15 g |

*Si is SF1188 (General Electric).

Components 1, 2, 4 and 6 were combined and mixed for two minutes, then components 3 and 5 were added. The mixture was stirred for 35 seconds @ 3000 rpm's, then dumped into mold at 25° C.

| Foam Reactivity | | |
|---|---|---|
| Cream Time | Foam Time | Tack Free Time |
| 15 sec | 48 sec | 1 min, 40 sec |

Example 5

A novolac-epoxy resin foam was formed by combining the components shown in Table 11.

TABLE 11

| | Component | Weight (g) |
|---|---|---|
| (1) | Epoxy Resin A | 150 g |
| (2) | Novolac Resin A | 150 g |
| (3) | Alkyl Polyamine | 25 g |
| (4) | Tween | 28 g |
| (5) | Si | 1 g |
| (6) | GBL | 15 g |

Components 1, 2, 4 and 6 were combined and mixed for two minutes, then components 3 and 5 were added. The mixture was stirred at 3,000 rpm's for 25 seconds, and dumped into a mold.

| Foam Reactivity | | |
|---|---|---|
| Cream Time | Foam Time | Tack Free Time |
| 35 sec | 1 min, 10 sec | 2 min, 15 sec |

Foam looked good from the skin thickness. When the foam was cut open the cells were small and friable. This foam may be suitable for some applications.

Example 6

A novolac-epoxy resin was formed by combining the components shown in Table 12.

TABLE 12

| | Component | Weight (g) |
|---|---|---|
| (A) | Epoxy Resin A | 100 g |
| (B) | Novolac Resin A | 200 g |
| (C) | Alkyl Polyamine | 35 g |
| (D) | Si | 1 g |
| (E) | GBL | 15 g |
| (F) | Tween | 28 g |

Components A, B, E, and F were combined and mixed for two minutes, then components C and D were added. The mixture was stirred for 35 seconds at 3000 rpm's, then dumped into a mold

| Foam Reactivity | | |
|---|---|---|
| Cream Time | Foam Time | Tack Free Time |
| 45 sec | 1 min, 30 sec | 2 min, 38 sec |

| Density of Foam | Cell Size of Foam |
|---|---|
| 15 pcf | .5–1 mm |

Foam looked good. The density was high and suitable for forming panels. Skin had nice appearance with no caverns. Mixed well and no voids. The foam did outgas during curing, which means the presence of open cells.

Example 7

A novolac-epoxy resin foam was formed by combining the components shown in Table 13.

TABLE 13

| | Component | Weight(g) |
|---|---|---|
| (A) | Epoxy Resin A | 100 g |
| (B) | Novolac Resin A | 200 g |
| (C) | Alkyl Polyamine | 35 g |
| (D) | Si | 2.5 g |
| (E) | Tween | 28 g |
| (F) | GBL | 10 g |

Components A, B, E, and F were combined and mixed for two minutes, then C and D were added. The mixture was stirred at 3000 rpm's for 25 seconds, and poured into a mold.

| Foam Reactivity | | |
|---|---|---|
| Cream Time | Foam Time | Tack Free Time |
| 40 sec | 1 min, 15 sec | 2 min, 10 sec |

| Density of Foam | Cell Size of Foam | pH |
|---|---|---|
| 3.5 pcf | .5 mm | 7.2 |

Foam looked good and would make good insulation since the pH was neutral. The foam had better physical than phenolic or urethane, and provided 90% closed cells.

| | Compressive Strength PSI | Flexual Strength PSI | Tensile Strength PSI |
|---|---|---|---|
| Parallel to Rise | 58 | 94 | 80 |
| Perpendicular | 52 | 105 | 100 |

Example 8

A novolac-epoxy resin was formed by combining the components shown in Table 14.

TABLE 14

| | Weight (g) | Component |
|---|---|---|
| (1) | 200 g | SLR-NPO1 |
| (2) | 100 g | SLR EPO3 |
| (3) | 80 g | $AlO_3$* |
| (4) | 5 g | Tween |
| (5) | 38 g | Alkylpolyamine |

*Flame Retardant Aluminum Trihydrate

Components 1, 2, 3 and 4 were combined and mixed at 3000 rpm's for 2 to 3 minutes. Then component 5 was added and mix for 35 seconds The mixture was then poured into mold and allowed to foam.

| Foam Reactivity | | |
|---|---|---|
| Cream Time | Foam Time | Tack Free Time |
| 32 sec | 1 min, 15 sec | 2 min, 40 sec |

Foam cells=0.5 mm
Closed cell contents=94%
ASTM F 5ol flame test "failed". However, this foam may have suitable flame retardancy for many applications.

Example 9

A novolac-epoxy resin was formed by combining the components shown in Table 15.

TABLE 15

| | | |
|---|---|---|
| (1) | 200 g | SLR-NPO1 |
| (2) | 100 g | SLR EPO3 |
| (3) | 150 g | $AlO_3$* |
| (4) | 5 g | Tween |
| (5) | 38 g | Alkylpolyamine |

Components 1, 2, 3 and 4 were combined in a container, mixed for two minutes, then component 5 was added and mixed for 40 seconds. The mixture was then poured into a mold and allowed to foam.

| Foam Reactivity | | |
| --- | --- | --- |
| Cream Time | Foam Time | Tack Free Time |
| 41 sec | 1 min, 31 sec | 2 min, 48 sec |

Foam had small cells=0.5 mm
Closed cell content=92%
ASTM F 5ol flame test—flame 15 cm, smoke heavy
  Still did not self-extinguish.

Example 10

A novolac-epoxy resin was formed by combining the components shown in Table 16.

TABLE 16

| (1) | 100 g | HRJ 444 |
| --- | --- | --- |
| (2) | 200 g | SLR-NPO1 |
| (3) | 80 g | Alo$_3$ |
| (4) | 50 g | NaSi* |
| (5) | 5 g | Tween |
| (6) | 38 g | Alkylpolyamine |

Components 1, 2, 3, 4 and 5 were combined in a container for and mixed two minutes, then component 6 was added mixed for 35 seconds at 3000 rpm's. The mixture was then poured it into a mold and allowed to foam.

| Foam Reactivity | | |
| --- | --- | --- |
| Cream Time | Foam Time | Tack Free Time |
| 1 min, 2 sec | 2 min, 5 sec | 2 min, 40 sec |

Longer foam and cream time.
Closed cell count=97%
Cell size=0.5 mm
Moisture absorption<3% by volume
ASTM F 501 flame test—flame length 5 cm, self-extinguished once flame was moved. This foam is suitable for application in mines and other closed-spaces where flame retardancy is desired.

Example 11

A novolac-epoxy resin was formed by combining the components shown in Table 17.

TABLE 17

|  | Weight(g) | Component |
| --- | --- | --- |
| (1) | 200 g | SLR-NPO1 |
| (2) | 100 g | SLR EPO3 |
| (3) | 80 g | AlO$_3$ |
| (4) | 5 g | Tween |
| (5) | 38 g | Alkylpolyamine |
| (6) | 66.6 | Sodium Silicate |

Components 1, 2, 3, 4 and 6 were combined and mixed at 3000 rpm's for 2 to 3 minutes. Then component 5 was added and mix for 35 seconds The mixture was then poured into mold and allowed to foam. A rigid foam was formed.

An Australian Fire Test was conducted on the foam. The test procedure is described as follows:

1. Principle:
    A test specimen of hardened resin is positioned horizontally across a 50 mm diameter hole cut in a small piece of cement sheet, and tested by the flame from a propane gas burner.
2. Apparatus and Reagents:
    propane gas burner
    stand for supporting the cement sheet
    stopwatch
    propane gas of at least 95% purity
3. Test Specimens:
    the samples should be in the form of cured block of dimensions 50 mm×50 mm (3 to 5 pieces)
4. Procedure:
    the specimens are tested as follows:
        the test block of hardened resin is positioned across the hole on the cement sheet
        the propane burner is lit and the flame adjusted to melt a piece of copper wire (diameter 0.7 mm) in 4 to 5 sec. The flame temperature is checked by a digital thermometer and should be greater than 700° C.
        the burner is positioned perpendicularly underneath the test block
        the burner flame is allowed to impinge on the test block for an initial period of 10 sec and then withdrawn
        observe any flame or glowing
        observe any smoke, most particular the color
        determine the persistence time of flame glow and smoke
        repeat using increasing flame application times, in increments of 10 sec up to a maximum of 60 sec.
        repeat for all tests blocks
        average the persistence time of flame glow and smoke after the removal of the burner
5. Report:
    the following information shall be reported:
        whether burning occurred and if extensive emphases
        the color of smoke, if any
        the average persistence time for flame, glow and smoke
6. Australian Requirement:
    When tested in accordance with the method detailed in above, the material shall fail if any of the following occur:
        after an exposure time of 20 sec, the mean persistence of the flame or glow is greater than 10 sec.
        after an exposure time of 60 sec, the mean persistence of the flame or glow is greater than 30 sec.

Sample pieces were cut to approximately 51 mm cubed. A 50-mm diameter hole was drilled in a 3-inch thick piece of cinder block. An 11-mm diameter burner was placed under the block and the flame was adjusted until the temperature at the top-center of the hole averaged about 900° C. Each piece was tested at the following intervals with the following results, as shown in Table 18.

TABLE 18

| Burn Time | Glow Time | Smoke Time | Smoke Color |
| --- | --- | --- | --- |
| 10 | 0 | 5 | Grey |
| 20 | 0 | 20 | Grey |
| 30 | 0 | 30 | Black-Grey |
| 40 | 0 | 35 | Black-Grey |
| 50 | 0 | 50 | Black-Grey |
| 60 | 0 | 60 | Black-Grey |

Damage to the foam was minimal. The center of the bottom surface of the block turned black, brown, and cracked in several places. These cracks are just at the very surface of the block. Some tiny pieces of foam popped off the surface of the block as it was tested. This occurred during the 30-second and 40 second burn tests. Thus, the rigid foam passed the rigid Australian Fire Test.

Example 12

A novolac-epoxy resin was formed by combining the components shown in Table 19.

TABLE 19

|     | Component       | Weight(g) |
|-----|-----------------|-----------|
| (A) | Epoxy Resin A   | 100 g     |
| (B) | Novolac Resin A | 200 g     |
| (C) | Alkyl Polyamine | 35 g      |
| (D) | Si              | 1 g       |
| (E) | GBL             | 15 g      |
| (F) | Tween           | 28 g      |
| (G) | Sodium Silicate | 66.6 g    |

Components A, B, E, F and G were combined and mixed for two minutes, then components C and D were added. The mixture was stirred for 35 seconds at 3000 rpm's, then allowed to foam. A flexible foam was formed. The Australian Fire Test was conducted on the foam in the same manner as Example 11. The test results are shown in Table 20.

TABLE 20

| Burn Time | Glow Time | Smoke Time | Smoke Color |
|-----------|-----------|------------|-------------|
| 10        | 0         | 5          | Grey        |
| 20        | 0         | 20         | Grey        |
| 30        | 0         | 30         | Black-Grey  |
| 40        | 0         | 40         | Black-Grey  |
| 50        | 0         | 50         | Black-Grey  |
| 60        | 0         | 60         | Black-Grey  |

Damage to the foam was minimal. The center of the bottom surface of the block turned black, brown, and cracked in several places. These cracks are just at the very surface of the block. Some tiny pieces of foam popped off the surface of the block as it was tested. This occurred during the 30-second and 40 second burn tests. Thus, the flexible foam passed the rigid Australian Fire Test.

Example 13

A lighter density novolac-epoxy resin was formed by combining the components shown in Table 20.

TABLE 20

|     | Weight(g) | Component                   |
|-----|-----------|-----------------------------|
| (1) | 200 g     | SLR-NPO1                    |
| (2) | 100 g     | HRJ 444                     |
| (3) | 80 g      | AlO₃                        |
| (4) | 5 g       | Tween                       |
| (5) | 40 g      | Alkylpolyamine              |
| (6) | 50 g      | Sodium Silicate             |
| (7) | 1.5 g     | Hydrogen Active Silicone EF-10 |

Components 1, 2, 3, 4, 6 and 7 were combined and mixed at 3000 rpm's for 30 seconds. Then component 5 was added and mix for 35 seconds The mixture was then poured into mold and allowed to foam. A flexible foam was formed. The foam was much lighter than those formed in Examples 1–12, and the density was about 4 pounds per square foot.

Example 14

A lighter density novolac-epoxy resin was formed by combining the components shown in Table 21.

TABLE 21

|     | Weight(g) | Component                   |
|-----|-----------|-----------------------------|
| (1) | 150 g     | SLR-NPO1                    |
| (2) | 150 g     | HRJ 444                     |
| (3) | 40 g      | AlO₃                        |
| (4) | 5 g       | Tween                       |
| (5) | 45 g      | Alkylpolyamine              |
| (6) | 40 g      | Sodium Silicate             |
| (7) | 1.5 g     | Hydrogen Active Silicone EF-10 |

Components 1, 2, 3, 4, 6 and 7 were combined and mixed at 3000 rpm's for 30 seconds. Then component 5 was added and mix for 35 seconds The mixture was then poured into mold and allowed to foam. A rigid foam was formed. The foam was much lighter than those formed in Examples 1–12, and the density was about 5 pounds per square foot. The foam had 94% closed-cells and passed the Australian Burn Test.

Example 15

A lighter density novolac-epoxy resin was formed by combining the components shown in Table 22.

TABLE 22

|     | Weight(g) | Component                   |
|-----|-----------|-----------------------------|
| (1) | 150 g     | SLR-NPO1                    |
| (2) | 150 g     | HRJ 444                     |
| (3) | 40 g      | AlO₃                        |
| (4) | 5 g       | Tween                       |
| (5) | 45 g      | Alkylpolyamine              |
| (6) | 45 g      | Sodium Silicate             |
| (7) | 2.24 g    | Hydrogen Active Silicone EF-10 |

Components 1, 2, 3, 4, 6 and 7 were combined and mixed at 3000 rpm's for 30 seconds. Then component 5 was added and mix for 30 seconds The mixture was then poured into mold and allowed to foam. The foam was much lighter than those formed in Examples 1–12, and the density was about 2 pounds per square foot. The foam was very rigid and had 87% closed-cells.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A novolac-epoxy resin foam having a cross-linked polymeric matrix formed by reacting a composition comprising:
   at least one liquid novolac resin;
   at least one liquid epoxy resin; and
   at least one reactive blowing agent which generates a blowing gas by reaction during curing of the novolac resin and epoxy resin and provides heat of reaction to increase a cure speed, wherein the composition is formulated such that when the novolac resin and epoxy resin are combined during foaming no external heat beyond ambient temperature is required to initiate the formation of the foam and once foaming is initiated heat from the reactive blowing agent increases the cure speed.

2. A foam according to claim 1, wherein at least 80% of the cells are closed.

3. A foam according to claim 1, wherein at least 90% of the cells are closed.

4. A foam according to claim 1, wherein the foam is a rigid novolac-epoxy resin foam formulated from more epoxy resin than novolac resin.

5. A foam according to claim 1, wherein the foam is a flexible novolac-epoxy resin foam formulated from more novolac resin than epoxy resin.

6. A loam according to claim 1, wherein said novolac resin is present in an amount of from about 5 to about 95% by weight and said epoxy resin is present in an amount of from about 5 to about 95% by weight, all weight % based on the total weight of the composition.

7. A foam according to claim 1, wherein said novolac resin is present in an amount of from about 20 to about 80% by weight and said epoxy resin is present in an amount of from about 20 to about 80% by weight, all weight % based on the total weight of the composition.

8. A foam according to claim 1, wherein said novolac resin is present in an amount of from about 40 to about 60% by weight and said epoxy resin is present in an amount of from about 40 to about 60% by weight, all weight % based on the total weight of the composition.

9. A foam according to claim 1, wherein at least one novolac resin is free of epoxide groups.

10. A foam according to claim 1, wherein the foam has a pH of from about 7 to about 9.

11. A foam according to claim 1, wherein the foam has a pH of about 9.

12. A foam according to claim 1, wherein the novolac resin has a number average molecular weight of from about 100 to about 500 and the epoxy resin has a number average molecular weight of about 250 to about 650.

13. A foam according to claim 1, wherein a ratio between novolac resin and epoxy resin has been adjusted to provide a more flexible foam by increasing the amount of novolak resin.

14. A foam according to claim 1, wherein a ratio between novolac resin and epoxy resin has been adjusted to provide a more rigid foam by increasing the amount of epoxy resin.

15. A foam according to claim 1, wherein the foam was formed under ambient pressure to provide a foam having a closed-cell content of greater than 80%.

16. A foam according to claim 1, wherein the foam was formed under ambient pressure to provide a foam having a closed-cell content of greater than 90%.

17. A foam according to claim 1, wherein the reactive blowing agent comprises a compound having a reactive hydrogen group and the composition further comprises an amine catalyst such that when the reactive blowing agent and the amine catalyst are combined hydrogen gas is formed which blows the foam and heat is produced which increases the curing speed of the novlac and epoxy reaction.

18. A foam according to claim 17, wherein the reactive blowing agent comprises a silicone compound having a reactive hydrogen group.

19. A foam according to claim 1, wherein the reactive blowing agent is present in an amount such that during blowing the temperature is raised from ambient temperature to about 100 to 140° F. within 1 minute after combining the novolac resin and epoxy resin.

20. A foam according to claim 1, wherein a surfactant was used to form the foam.

21. A foam according to claim 20, wherein the surfactant is present in an amount of from about 0.01% to about 5% by weight.

22. A foam according to claim 1, wherein foam is free of hydroxyl groups to increase non-flamability.

23. A foam according to claim 1, further comprising a flame retardant to increase non-flamability of the foam.

24. A foam according to claim 23, wherein the flame retardant is present in a amount of from about 10% to about 40% by weight.

25. A foam according to claim 1, wherein the foam is a sprayed novolac-epoxy resin foam.

26. A foam according to claim 25, wherein the composition has a viscosity of about 50 to about 1000 centipoise at 25° C.

27. A foam according to claim 25, wherein the composition has a viscosity of about 50 to about 500 centipoise at 25° C.

28. A foam according to claim 25, wherein the composition has a cure speed of about 5 minutes or less.

29. A foam according to claim 25, further comprising at least two foam layers.

30. A foam according to claim 29, wherein a first foam layer was sprayed on a second foam layer before the first foam layer cured so that the first and second foam layers co-cured to provide adhesion between the first and second layers.

31. A foam according to claim 25, wherein the sprayed foam covers an article.

32. A foam according to claim 1, wherein the epoxy resin has about 2 or more terminal epoxide groups on average.

33. A foam according to claim 1, wherein the epoxy resin has about 3 terminal epoxide groups on average.

34. A foam according to claim 25, wherein the epoxy resin has about 2 or more terminal epoxide groups on average.

35. A foam according to claim 1, wherein the foam is an insulating foam suitable for automotive applications in that is has high temperature resistance and is light weight and non-toxic when burned.

36. A foam according to claim 1, wherein the foam is suitable for mining applications in that is has high temperature resistance and exhibits low outgassing.

37. A foam according to claim 1, wherein the foam is suitable for residential and commercial building applications in that it is self extinguishing and does not produce toxic fumes when burned.

38. A foam according to claim 37, wherein the foam is in the form of a rigid support panel.

39. A foam according to claim 1, wherein the foam is flexible or high strength rigid foam suitable for airplane applications in that it has light weight, non-toxic when burned, high temperature resistance, and corrosion resistance.

40. A foam according to claim 1, wherein the foam is suitable for ship applications in that it has high temperature resistance, corrosion protection, and low toxicity when burned.

41. A foam according to claim 1, wherein the foam is suitable for prototyping applications in that it has high temperature resistance and corrosion resistance.

42. A foam according to claim 1, wherein the foam is suitable for artistic applications in that it has high temperature resistance and corrosion resistance.

43. A foam according to claim 1, wherein the foam is suitable for aerospace applications in that it has high temperature resistance and flexibility over a wide temperature range.

44. A foam according to claim 1, wherein the foam is suitable for heat shielding applications in that it has high temperature resistance.

45. A foam according to claim 1, wherein the foam is suitable for mass transit applications in that it has high temperature resistance and is non-toxic.

46. A foam according to claim 1, wherein the foam is suitable for applications requiring high temperature resistance, non-toxicity and non-corrosiveness.

47. A foam according to claim 25, wherein the epoxy resin has about 3 terminal epoxide groups on average.

48. A sprayed novolac-epoxy resin foam having a cross-linked polymeric matrix formed by spraying a foamable composition having a viscosity of about 50 to about 1000 centipoise at 25° C. comprising:

at least one liquid novolac resin having a viscosity of about 100 to about 3,000 centipoise at 25° C;

at least one liquid epoxy resin having a viscosity of about 100 to about 10,000 centipoise at 25° C.; and at least one reactive blowing agent which generates a blowing gas by reaction during curing of the novolac resin and epoxy resin and provides heat of reaction to increase a cure speed, wherein the composition is formulated such that when the novolac resin and epoxy resin are combined during foaming no external heat beyond ambient temperature is required to initiate the formation of the foam and once foaming is initiated heat from the reactive blowing agent increases the cure speed.

\* \* \* \* \*